(12) United States Patent
Liu

(10) Patent No.: US 6,945,210 B2
(45) Date of Patent: Sep. 20, 2005

(54) COMBUSTION CHAMBER WITH ONE CONCAVE SURFACE AND THREE CONVEX SURFACES

(75) Inventor: Zhengbai Liu, Naperville, IL (US)

(73) Assignee: International Engine Intellectual Property Company, LLC, Warrenville, IL (US)

(*) Notice: Subject to any disclaimer, the term of this patent is extended or adjusted under 35 U.S.C. 154(b) by 0 days.

(21) Appl. No.: 10/673,977

(22) Filed: Sep. 29, 2003

(65) Prior Publication Data

US 2005/0066929 A1 Mar. 31, 2005

(51) Int. Cl.[7] .............................. F02B 23/00
(52) U.S. Cl. ..................... 123/193.4; 123/193.6; 123/663
(58) Field of Search .................. 123/663, 664, 123/193.6, 276, 193.4

(56) References Cited

U.S. PATENT DOCUMENTS

| | | | |
|---|---|---|---|
| 4,137,873 A | * | 2/1979 | Caswell, Sr. .............. 123/78 B |
| 4,140,096 A | * | 2/1979 | Dunn et al. .............. 123/193.6 |
| 4,164,913 A | | 8/1979 | Komiyama et al. |
| 4,270,494 A | * | 6/1981 | Garter et al. ............ 123/41.35 |
| 4,535,683 A | | 8/1985 | Dworak et al. |
| 4,721,080 A | | 1/1988 | Moriyasu et al. |
| 4,883,032 A | | 11/1989 | Hunter et al. |
| 5,029,563 A | | 7/1991 | Hu |
| 5,285,755 A | | 2/1994 | Regueiro |
| 5,560,334 A | | 10/1996 | Daxer et al. |
| 5,653,204 A | | 8/1997 | Shaffer |
| 5,809,962 A | | 9/1998 | Abbott et al. |
| 5,868,112 A | | 2/1999 | Mahakul et al. |
| 5,954,038 A | | 9/1999 | Warwick et al. |
| 6,112,715 A | | 9/2000 | Nigro et al. |
| 6,536,404 B2 | | 3/2003 | Liu et al. |
| 6,637,402 B2 | | 10/2003 | Liu |

* cited by examiner

Primary Examiner—Thomas Denion
Assistant Examiner—Zelalem Eshete
(74) Attorney, Agent, or Firm—Dennis Kelly Sullivan; Susan L. Lukasik; Jeffrey P. Calfa

(57) ABSTRACT

A combustion chamber assembly for use in a piston of a diesel engine includes a combustion chamber defined intersecting a crown of the piston, the combustion chamber being defined by a concave surface in cooperation with three convex surfaces, adjacent surfaces having direct smooth junctures.

A piston and a method of forming a combustion chamber are further included.

49 Claims, 2 Drawing Sheets

COMBUSTION CHAMBER WITH ONE CONCAVE SURFACE AND THREE CONVEX SURFACES

TECHNICAL FIELD

The present invention relates to a piston designed for use in a compression ignition (diesel) internal combustion engine. More particularly, the present invention relates to a combustion chamber defined in part in a piston and intersecting the crown of the piston.

BACKGROUND OF THE INVENTION

Many attempts have been made to produce an ideal flow pattern for the charge of air and fuel within the combustion chamber of an internal combustion engine. Considerations that must be taken into effect include, but are not limited to, providing for adequate power generation, minimizing the $NO_x$ entrained in the engine exhaust, and minimizing the amount of soot particulate also entrained in the engine exhaust. These last two considerations should be accomplished without hurting the fuel economy of the engine and without adversely affecting the power output of the engine.

It is known that changes in any one of a variety of engine design/operating variables, such as engine compression ratio, combustion chamber shape, fuel injection spray pattern, and other variables can have an affect on both emissions and power generated.

The amount of soot that is expelled with the engine's exhaust is unsightly and generates public pressure to clean up diesel engines. Further, the amount of soot that is entrained in the engine's lubrication oil can have a deleterious effect on engine reliability. Soot is very abrasive and can cause high engine wear.

There is additionally a great deal of pressure to reduce the $NO_x$ emissions from the engine. Ever increasing regulatory demands mandate reduced levels of $NO_x$. Typically, a combustion chamber design that is effective at reducing $NO_x$ levels has been found to increase the levels of soot and vice-versa. Additionally, doing either of the aforementioned typically reduces engine torque and power outputs.

There are numerous examples of combustion chambers formed in the crown of a piston. Notwithstanding all these prior art designs, there remains a need for reduction both in $NO_x$ and entrained soot while at the same time maintaining or enhancing engine torque and power outputs without adversely affecting the fuel economy of the engine.

SUMMARY OF THE INVENTION

The piston of the present invention substantially meets the aforementioned needs of the industry. The combustion chamber of the present invention defined intersecting the crown of the piston has been shown by substantiated simulation to greatly increase turbulence kinetic energy to the chamber and thereby to both reduce soot entrainment and $NO_x$ emissions. The piston has been shown to function effectively with cylinder heads having two or more valves. A further advantage of the piston of the present invention is that by being symmetrical with respect to a piston central axis, the combustion chamber is relatively more easily formed in the crown of the piston than known asymmetrical combustion chambers. The piston and combustion chamber of the present invention are preferably used in heavy-duty and medium-duty diesel engines.

The present invention is a combustion chamber assembly for use in a piston of a diesel engine includes a combustion chamber defined intersecting a crown of the piston, the combustion chamber being defined by a concave surface in cooperation with three convex surfaces, adjacent surfaces having direct smooth junctures.

The present invention is further a piston and a method of forming a combustion chamber.

DETAILED DESCRIPTION OF THE DRAWINGS

Figure 1:
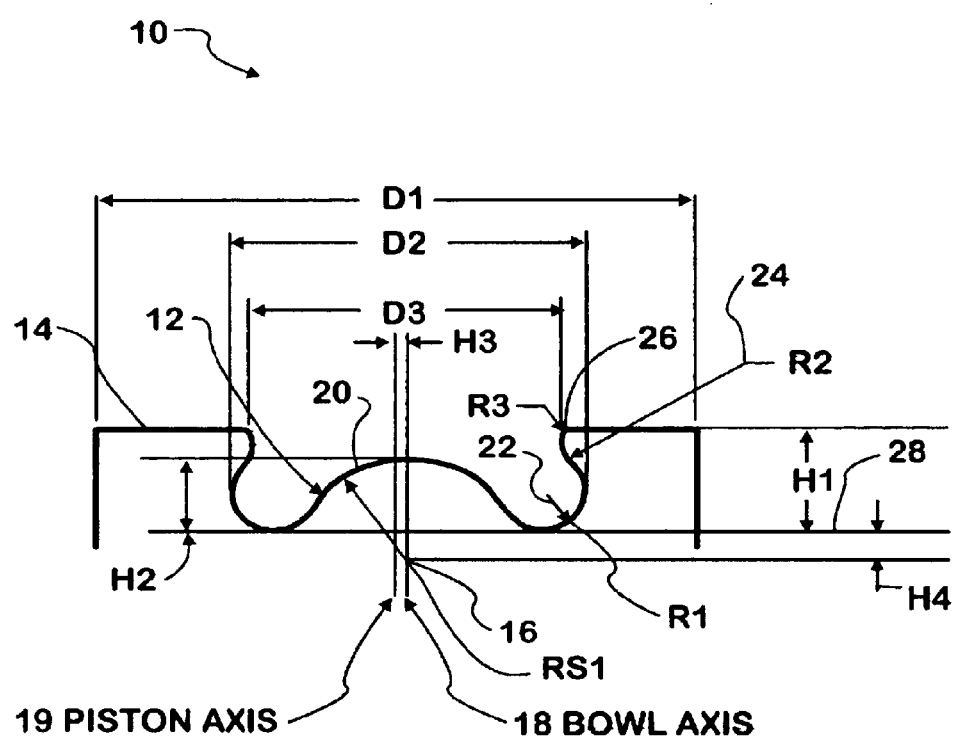
FIG. 1 is a sectional view of the piston and combustion chamber of the present invention.

The piston of the present invention is shown generally at 10 in FIG. 1. Generally, the piston 10 has a centrally located symmetrical upward-opening chamber bowl for forming a combustion chamber 12 in cooperation with cylinder structure within a cylinder of a diesel engine. The combustion chamber 12 is defined intersecting the crown 14 of the piston 10. The engine has a fuel injector (not shown) disposed generally above the piston 10 for forming an injected fuel plume relative to the combustion chamber 12. The piston 10 may be utilized with two-valve or multiple-valve heads. The piston 10 is effective for reducing diesel engine pollutant emissions, such as $NO_x$ and soot, as depicted in the graphic representations of FIGS. 2 and 3. The piston 10 is preferably applicable to heavy-duty and medium duty diesel engines. The design of the chamber 12 is simplified with respect to prior art chambers in that chamber 12 is formed of only three convex surfaces and a concave surface.

The piston 10 has a symmetrical upwardly opening cavity or bowl for forming a major part of the combustion chamber 12 within a cylinder of a diesel engine. The combustion chamber (bowl) 12 can generally be described as having a convex spherical bowl post RS1, concave annular bowl bottom and lower combustion bowl side R1, a convex annular upper combustion bowl side R2, and a convex juncture with the crown 14, R3, as described in more detail below. Surface R1 forms a minor part of the bowl 12 reentrancy and surface R2 forms a major part of the bowl 12 reentrancy. Surface R3 functions primarily to smoothly transition bowl 12 to crown 14.

The combustion chamber 12 is located intersecting the piston crown 14 of a diesel engine piston 10 and comprises a portfolio of only four curved surfaces, as shown in FIG. 1. The four curved surfaces, RS1, R1, R2, and R3, each have smooth junctures with adjacent curved surfaces, thereby requiring no additional surfaces to effect the junctures.

The spherical surface RS1, with an origin 16 preferably lying on the center chamber axis 18 forms the upper portion of the post 20 of the combustion chamber 12. The chamber (bowl) axis 18 and the center axis 19 of the piston 10 may be co-axial. The spherical surface RS1 is located at the central bottom portion of the combustion chamber 12 to partially form the post 20, forming the upper peak portion of the post 20, and has a radius of RS1 extending from the origin 16. The spherical surface RS1 is a convex spherical surface.

The annular surface R1 forms the combustion bowl 12 bottom, the lower part of the sidewall of the combustion chamber 12, the minor reentrancy of the bowl of the combustion chamber 12 and the lower portion of the post 20.

Annular surface R1 has a radius of R1 extending from an origin 22 and is smoothly joined directly to the surface RS1 forming the upper portion of the post 20. The annular surface R1 is generally concave.

The combustion chamber 12 has a further convex surface, annular surface R2 with a radius of R2 extending from an origin 24. Surface R2 forms the upper portion of the side of the combustion chamber 12 and the main part of the reentrancy of the combustion chamber 12.

An additional convex surface is surface R3. The annular surface R3 provides a smooth transition between the bowl 12 sidewall and the piston crown 14. The annular surface R3 has a radius R3 extending from an origin. The annular surface R2 is directly smoothly joined to surface R3 without any additional surface.

It should be noted that the combustion chamber 12 as defined above is free of straight surfaces and that the four curved surfaces, RS1, R1, R2, and R3, defining the combustion chamber 12 are smoothly joined to minimize flow loss occurring in the combustion chamber 12.

As indicated In FIG. 1, D1 is the diameter of the piston 10, D2 is the maximum diameter of the combustion chamber 12, D3 is the diameter of the bowl lip 26, H1 is the chamber bowl depth to bottom plane 28, H2 is the height of the bowl post 20 above a bottom plane (bottom plane 28 is defined transverse to the axis 18 and tangent to the bottom of the annular surface R1), and H3 is the distance between the bowl axis 18 and the piston axis 19.

The origin of spherical surface RS1 is located on the central axis 18 of the combustion chamber bowl 12. The distance H4 between the origin of spherical surface RS1 and the point of intersection of the combustion chamber axis 18 with the bottom plane 28 of the combustion chamber 12 should be equal to or greater than zero and should be less than 0.26 D1, and is preferably 0.0526 D1. The central axis 18 of the combustion chamber bowl can coincide with the central axis 19 of the piston 10 or has an offset, that is the distance H3 between the central axis 18 of the combustion chamber 10 and the central axis 19 of the piston that should be equal to or greater than zero and should be less than 0.085 D1, and is preferably zero.

The relationship of parameters that further control the combustion chamber 12 geometry and the combustion performance and emissions of the present invention in diesel engines are listed below:

1. The ratio of D2/D1 is greater than 0.46 and is less than 0.86, and is preferably 0.598, D1 being the piston 10 diameter and D2 being the maximum diameter of the combustion chamber 12.
2. The ratio of D3/D2 is greater than 0.44 and is less than 0.999 and is preferably 0.88, D3 being the diameter of the bowl lip.
3. The ratio of RS1/D2 is greater than 0.11 and is less than 0.48, and is preferably 0.314.
4. The ratio of H1/D2 is greater than 0.24 and is less than 0.54 and is preferably 0.308, H1 being the depth of the combustion chamber bowl 12.
5. The ratio of H2/D2 is greater than 0.13 and is less than 0.43, and is preferably 0.226, H2 being the height of the post 20.
6. The ratio of R1/D2 is greater than 0.06 and less than 0.36, and is preferably 0.12.
7. The ratio of R2/D2 is greater than 0.06 and less than 0.41 and is preferably 0.141.
8. The ratio of R3/D2 is greater than 0.01 and less than 0.12 and is preferably 0.026.

The curved surfaces and smooth transitions (junctures between adjacent curved surfaces) of the combustion chamber 12 as previously described promote smooth flow in the combustion chamber 12 and act to reduce the thermal loading in the combustion chamber 12. Further, the combustion chamber 12 is symmetrical about the chamber axis 18 and preferably also about the piston axis 19. Accordingly, it is much easier to turn (form) the combustion chamber 12 in the crown 14 of the piston 10 as compared to an asymmetrical combustion chamber defined in a piston.

Figure 2:
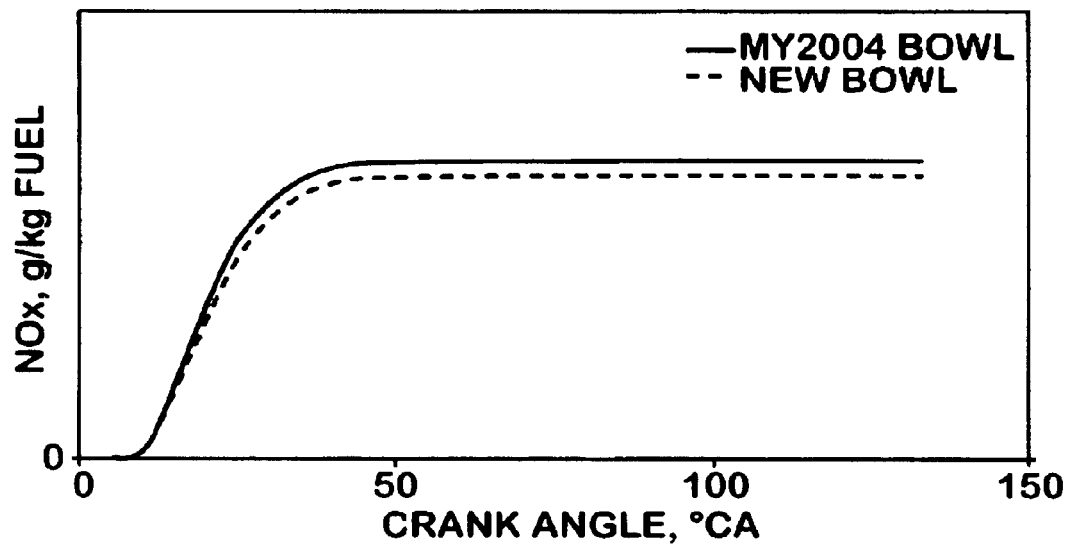
FIG. 2 is a graphic representation of a prior art chamber bowl of $NO_x$ generated with respect to crank angle, noted as MY 2004, and a simulation of $NO_x$ generated by an engine with pistons and combustion chambers of the present invention, noted as new bowl.

FIG. 2 displays a comparison of $NO_x$ emissions between the prior art baseline combustion chamber, MY 2004 bowl and combustion chamber 12, noted as new bowl. It is evident that the NO, emissions in the four curve combustion chamber 12 of the present invention are reduced significantly, compared with the baseline combustion chamber.

Figure 3:
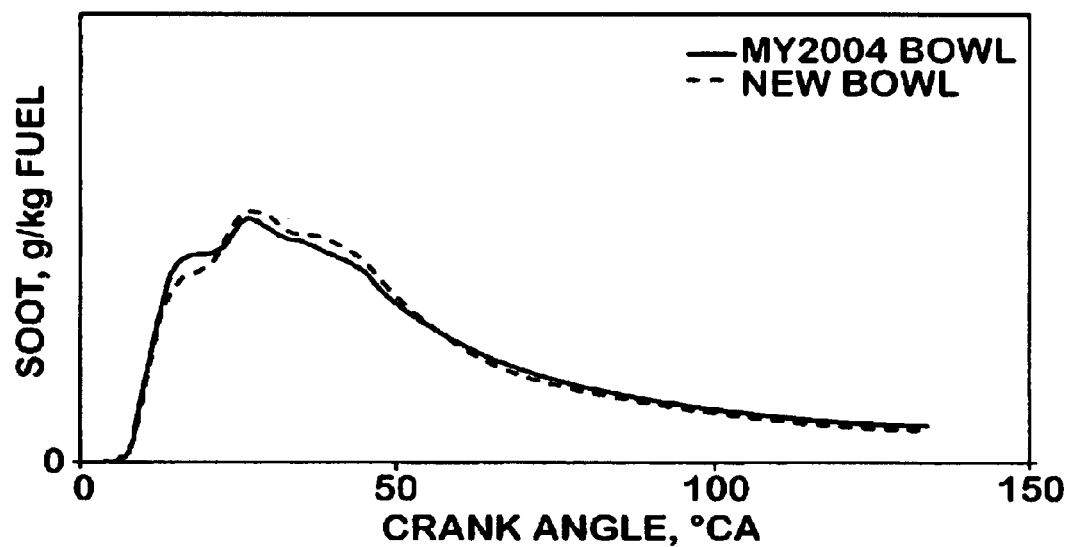
FIG. 3 is a graphic representation of the soot generated by the prior art chamber bowl, MY 2004, of FIG. 2 as compared to the combustion chamber of the present invention, noted as new bowl.

FIG. 3 presents a comparison of soot emissions between two types of combustion chambers. It is clear that the soot emissions in the four curve combustion chamber 12 (noted as new bowl) are much lower than those in the baseline combustion chamber, MY 2004 bowl.

It will be obvious to those skilled in the art that other embodiments in addition to the ones described herein are indicated to be within the scope and breadth of the present application. Accordingly, the applicant intends to be limited only by the claims appended hereto.

What is claimed is:

1. A combustion chamber assembly for use in a piston of a diesel engine, comprising:
   an inflexible combustion chamber being defined intersecting a crown of the piston, the crown being orthogonally disposed relative to a side wall of the piston, the combustion chamber being defined by a concave surface and three convex surfaces, adjacent surfaces having direct smooth junctures and being formed free of flat surfaces, a certain two of the convex surfaces cooperatively forming a combustion chamber reentrancy.

2. The combustion chamber assembly of claim 1, including:
   a combustion chamber center portion being defined at least in part by the convex sphere to define a post, the sphere having a radius and an origin, the origin of the radius lying on a combustion chamber central axis;
   a combustion chamber second curved surface forming substantially a bowl bottom margin and being a concave annular surface and having an origin and a radius and being joined to the post, the second curved surface providing a minor part of the combustion chamber reentrancy;
   a combustion chamber third curved surface being a convex annular surface and forming a portion of a combustion chamber side margin and providing a major part of the combustion chamber reentrancy, the third curved surface having an origin and a radius and being joined to the second curved surface; and
   a combustion chamber fourth curved surface defining convex annular bowl lip surface intersecting the crown of the piston and being joined to the third curved surface.

3. The combustion chamber assembly of claim 2 wherein the origin of the post is disposed on the center axis of the combustion chamber, the center axis of the combustion chamber being coaxial with the center axis of the piston.

4. The combustion chamber assembly of claim 1 wherein a juncture between adjacent curved surfaces requires no additional surfaces to effect a smooth transition therebetween.

5. The combustion chamber assembly of claim 1 wherein the combustion chamber is symmetrical about a combustion chamber center axis.

6. The combustion chamber assembly of claim 2 wherein the ratio of a radius of a center portion convex spherical surface, RS1, of the combustion chamber to a maximum bowl diameter, D2, is greater than 0.11 and less than 0.48.

7. The combustion chamber assembly of claim 6 wherein the ratio of the radius of the center portion convex spherical surface, RS1, of the combustion chamber to the maximum bowl diameter, D2, is substantially 0.314.

8. The combustion chamber assembly of claim 2 wherein the ratio of a combustion chamber bowl diameter D2 to a piston diameter D1 is greater than 0.46 and less than 0.86.

9. The combustion chamber assembly of claim 8 wherein the ratio of the combustion chamber bowl diameter D2 to the piston diameter D1 is preferably substantially 0.598.

10. The combustion chamber assembly of claim 2 wherein the ratio of a diameter of the bowl lip D3 to a maximum bowl diameter D2 is greater than 0.44 and less than 0.999.

11. The combustion chamber assembly of claim 10 wherein the ratio of the diameter of the bowl lip D3 to the piston diameter D2 is substantially 0.88.

12. The combustion chamber assembly of claim 2 wherein the ratio of a concave annular surface R1 to a maximum diameter of the bowl D2 is between 0.06 and 0.36.

13. The combustion chamber assembly of claim 12 wherein the ratio of the annular surface R1 to the maximum diameter of the bowl D2 is substantially 0.12.

14. The combustion chamber assembly of claim 2 wherein the ratio of a convex annular surface R2 to a maximum diameter of the bowl D2 is between 0.06 and 0.41.

15. The combustion chamber assembly of claim 14 wherein the ratio of the annular surface R2 to the maximum diameter of the bowl D2 is substantially 0.141.

16. The combustion chamber assembly of claim 2 wherein the ratio of a maximum bowl depth H1 to a maximum bowl diameter D2 is between 0.24 and 0.54.

17. The combustion chamber assembly of claim 16 wherein the ratio of the maximum bowl depth H1 to the maximum bowl diameter D2 is preferably substantially 0.308.

18. The combustion chamber assembly of claim 2 wherein a ratio of a height of the bowl post H2 to a maximum bowl diameter D2 is between 0.13 and 0.43.

19. The combustion chamber assembly of claim 18 wherein the ratio of the bowl post height H2 to the maximum bowl diameter D2 is preferably substantially 0.226.

20. The combustion chamber assembly of claim 1 the combustion chamber having a central axis, the combustion chamber central axis being coincident with a piston central axis.

21. A piston of a diesel engine having a combustion chamber assembly, comprising:
an inflexible combustion chamber being defined intersecting a crown of the piston, the crown being orthogonally disposed relative to a side wall of the piston, the combustion chamber being defined by a concave surface in cooperation with three convex surfaces, adjacent surfaces having direct smooth junctures, a certain two of the convex surfaces cooperatively forming a combustion chamber reentrancy.

22. The piston of claim 21, including a combustion chamber center portion, the center portion being defined at least in part by the convex sphere to define a post, the sphere having a radius and an origin, the origin of the radius lying on a combustion chamber central axis;
a combustion chamber second curved surface forming in part a bowl bottom margin and being a concave annular surface having an origin and a radius and being joined to the post;
a combustion chamber third curved surface being a convex annular surface and forming a portion of a combustion chamber side margin and providing a major part of the combustion chamber reentrancy, the third curved surface having an origin and a radius and being joined to the second curved surface; and
a combustion chamber fourth curved surface further being a convex annular bowl lip surface intersecting the crown of the piston and joined to the third curved surface.

23. The piston of claim 22 wherein the origin of the post is disposed on the combustion chamber center axis, the center axis of the combustion chamber being coaxial with the center axis of the piston.

24. The piston of claim 21 wherein the juncture between adjacent curved surfaces requires no additional surfaces to effect a smooth transition therebetween.

25. The piston of claim 21 wherein the combustion chamber is symmetrical about a combustion chamber center axis.

26. The piston of claim 22 wherein the ratio of a radius of the center portion convex spherical surface, RS1, of the combustion chamber to a maximum bowl diameter, D2, is greater than 0.11 and less than 0.48.

27. The piston of claim 26 wherein the ratio of the radius of the center portion convex spherical surface, RS1, of the combustion chamber to the maximum bowl diameter, D2, is substantially 0.314.

28. The piston of claim 22 wherein a ratio of the combustion chamber bowl diameter D2 to a piston diameter D1 is greater than 0.46 and less than 0.86.

29. The piston of claim 28 wherein the ratio of the combustion chamber bowl diameter D2 to the piston diameter D1 is preferably substantially 0.598.

30. The piston of claim 22 wherein a ratio of the diameter of the bowl lip D3 to a maximum bowl diameter D2 is greater than 0.44 and less than 0.999.

31. The piston of claim 30 wherein the ratio of the diameter of the bowl lip D3 to the piston diameter D2 is substantially 0.88.

32. The piston of claim 22 wherein the ratio of a annular surface R1 to a maximum diameter of the bowl D2 is between 0.06 and 0.36.

33. The piston of claim 32 wherein the ratio of the annular surface R1 to the maximum diameter of the bowl D2 is substantially 0.12.

34. The piston of claim 22 wherein a ratio of an annular surface R2 to a maximum diameter of the bowl D2 is between 0.06 and 0.41.

35. The piston of claim 34 wherein the ratio of the annular surface R2 to the maximum diameter of the bowl D2 is substantially 0.141.

36. The piston of claim 22 wherein a ratio of a maximum bowl depth H1 to a maximum bowl diameter D2 is between 0.24 and 0.54.

37. The piston of claim 36 wherein the ratio of the maximum bowl depth H1 to the maximum bowl diameter D2 is preferably substantially 0.308.

38. The piston of claim 22 wherein a ratio of the height of the bowl post H2 to a maximum bowl diameter D2 is between 0.13 and 0.43.

39. The piston of claim 38 wherein the ratio of the bowl post height H2 to the maximum bowl diameter D2 is preferably substantially 0.226.

40. The piston of claim 22 the combustion chamber having a central axis, the combustion chamber central axis being coincident with a piston central axis.

41. A method of forming a combustion chamber for use in a piston of a diesel engine, comprising:

defining an inflexible combustion chamber bowl intersecting a crown of the piston, the crown being orthogonally disposed relative to a side wall of the piston, defining a piston central axis, forming the combustion chamber by a concave surface in cooperation with three convex surfaces and joining adjacent curved surfaces directly to smoothly form surface junctures, forming the combustion chamber bowl free of first surfaces, and cooperatively forming a combustion chamber reentrancy from a certain two of the convex surfaces.

42. The method of claim 41 including:

defining a combustion chamber elevated center post at least in part by a portion of a convex sphere, the sphere having a radius and an origin, defining a combustion chamber bottom margin in part and lower sidewall by a first annular surface, the first annular surface having a radius and smoothly joining the annular surface to the post;

defining a combustion chamber upper sidewall and major reentrancy by a second annular surface, the second annular surface having a radius and an origin and smoothly joining the first annular surface; and defining a bowl lip by a third annular surface, the third annular surface providing a smooth transition to he crown of the piston and being smoothly joined to the second annular surface.

43. The method of claim 41 including defining smooth surface junctures between adjacent curved surfaces, without introducing any additional bowl surfaces.

44. The method of claim 41 including disposing the origin of the center post on the piston central axis.

45. The method of claim 41 including disposing a combustion chamber central axis coincident with the piston central axis.

46. The combustion chamber assembly of claim 2 wherein the ratio of the annular surface radius R3 to the maximum diameter of the bowl D2 is between 0.01 and 0.12.

47. The combustion chamber assembly of claim 46 wherein the ratio of the annular surface radius R3 to the maximum diameter of the bowl D2 is preferably 0.026.

48. The combustion chamber assembly of 22 wherein the ratio of the annular surface radius R3 to the maximum diameter of the bowl D2 is between 0.01 and 0.12.

49. The combustion chamber assembly of claim 48 wherein the ratio of the annular surface radius R3 to the maximum diameter of the bowl D2 is preferably 0.026.

* * * * *